United States Patent [19]

Mitsumoto

[11] Patent Number: 5,399,091
[45] Date of Patent: Mar. 21, 1995

[54] DRIVE SIMULATION APPARATUS

[75] Inventor: Kazuhiko Mitsumoto, Tokyo, Japan

[73] Assignee: Tomy Company, Ltd., Tokyo, Japan

[21] Appl. No.: 51,667

[22] Filed: Apr. 26, 1993

[30] Foreign Application Priority Data

Apr. 27, 1992 [JP] Japan .................... 4-131453

[51] Int. Cl.⁶ .............................................. G09B 9/05
[52] U.S. Cl. ........................................ 434/61; 434/70
[58] Field of Search ................... 434/61, 29, 70, 62

[56] References Cited

U.S. PATENT DOCUMENTS

| | | | |
|---|---|---|---|
| 3,479,750 | 11/1969 | Swanson | 434/62 |
| 4,276,030 | 6/1981 | Radice . | |
| 4,464,117 | 8/1984 | Foerst . | |
| 4,710,129 | 12/1987 | Newman et al. . | |
| 4,887,967 | 12/1989 | Letovsky et al. | 434/61 |

FOREIGN PATENT DOCUMENTS 0406729  1/1991  European Pat. Off. .............. 434/61
1035574  7/1966  United Kingdom .

*Primary Examiner*—Gene Mancene
*Assistant Examiner*—Jeffrey A. Smith
*Attorney, Agent, or Firm*—Staas & Halsey

[57] ABSTRACT

A drive simulation apparatus is provided with a base, a driving compartment body, a seat, a steering wheel, a non-motorized turning mechanism, road terrain display mechanism and a body vibrating mechanism. The driving compartment body is rotatably provided mounted on the base. The seat accommodates a player and is attached to and rotatable with the body. The steering wheel is rotatably mounted to the body. The non-motorized turning mechanism turns the body with respect to the base when the steering wheel is turned with respect to the body. The road terrain display mechanism displays moving road terrain. The body vibrating mechanism vibrates the body.

13 Claims, 13 Drawing Sheets

DRIVE SIMULATION APPARATUS

BACKGROUND OF THE INVENTION

1. Field of the Invention

The present invention relates in general to amusement devices, and more particularly, to a drive simulation apparatus.

2. Description of the Related Art

Drive simulation apparatuses for simulating driving while not moving have been installed in amusement parks and game centers. Such a drive simulation apparatus provides a player with the feeling of driving without exposing the player to the dangers associated with actual driving. The drive simulation apparatus provides an image of a car traversing a road. The drive simulation apparatus may also move the player in directions which correspond to those moved while driving.

However, such a drive simulation apparatus as found in game centers and amusements parks requires a large motor and a complicated drive mechanism to move the player through the drive motions. Both of these requirements make the apparatus quite large. Therefore, such a drive simulation apparatus, while appropriate for amusement parks and game centers where a large amount of space is available, is inappropriate for the home setting. Furthermore, such a drive simulation apparatus is too heavy to be transportable, and therefore, must be used in the location in which it is installed.

SUMMARY OF THE INVENTION

It is an object of the present invention to provide a drive simulation apparatus which provides a player with an authentic driving feeling in the home setting. It is a further object to provide a drive simulation apparatus which is light enough to be transportable.

To achieve the above object, the present invention a drive simulation apparatus is provided having a base, a driving compartment body, a seat, a steering wheel, a non-motorized turning mechanism, road terrain display mechanism and a body vibrating mechanism. The driving compartment body is rotatably provided mounted on the base. The seat accommodates a player and is attached to and rotatable with the body. The steering wheel is rotatably mounted to the body. The non-motorized turning mechanism turns the body with respect to the base when the steering wheel is turned with respect to the body. The road terrain display mechanism displays moving road terrain. The body vibrating means vibrates the body.

DESCRIPTION OF THE PREFERRED EMBODIMENT

An embodiment of the present invention will hereinafter be described with reference to the accompanying drawings.

Figure 1:
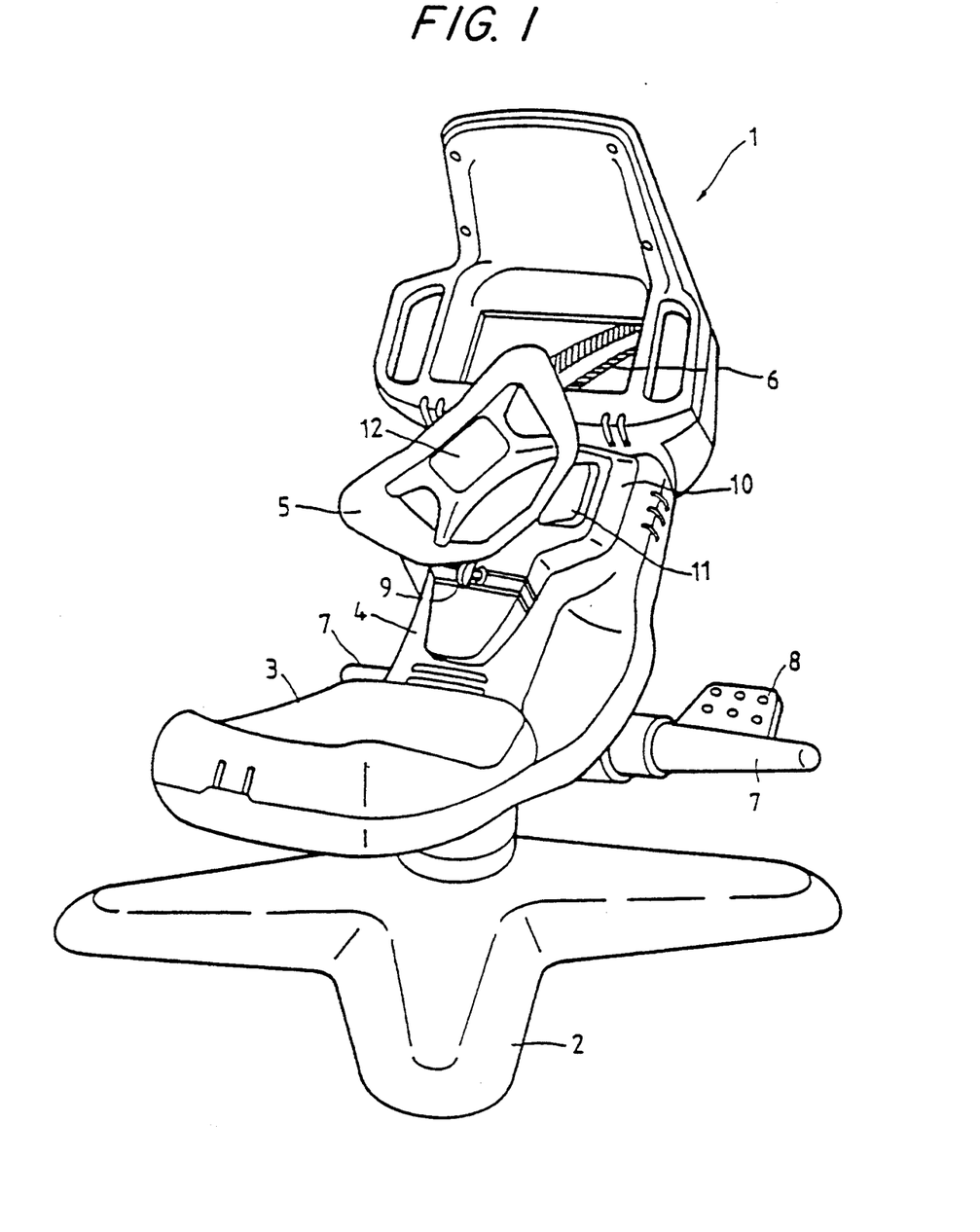
FIG. 1 is a perspective view illustrating a drive simulation apparatus according to an embodiment of the present invention.

FIG. 1 is a perspective view of the exterior of a drive simulation apparatus according to an embodiment of the present invention. As shown in FIG. 1, the drive simulation apparatus 1 is similar to an arcade game apparatus in that it has a base 2 and a driving compartment body 4 supported on the base 2. The driving compartment body 4 has a seat 3, a steering wheel 5 and a road terrain display mechanism 6 provided in a front portion of the driving compartment body 4. The driving compartment body 4 is also provided with footrests 7 extending in a lateral direction from a lower portion thereof. The right footrest 7 has an accelerator pedal 8.

The operation of the drive simulation apparatus 1 will now be explained. When a key 9 is turned on, the drive simulation apparatus is started and road terrain is displayed on the road terrain display mechanism 6. If the accelerator pedal 8 is depressed while the drive simulation apparatus is turned on, the road terrain moves so that the player feels as if he or she were driving on the road terrain.

When a curve is shown in the road terrain, the player rotates the steering wheel 5 in a left or right direction corresponding to the curve. The steering wheel 5 rotation causes the driving compartment body 4 to rotate with respect to base 2 in the direction which the steering wheel 5 was turned. This gives the player the feeling as if he or she were driving on the curved road displayed in the road terrain display mechanism 6. Further, a turbo button 11 is provided on the dashboard of the driving compartment body 4. When the turbo button 11 is depressed, a turbo sound is emitted and the road terrain moves at a higher speed. Also, depression of a horn button 12 provided in the center of the steering wheel 5 causes a horn to be sounded.

Next, the structure of the drive simulation apparatus 1 will be specifically explained.

A. Turning Mechanism of the Driving Compartment Body

As stated above, the driving compartment body 4 is rotatably supported on the base 2 so that it moves via a non-motorized mechanism when the steering wheel is manipulated.

Figure 2:
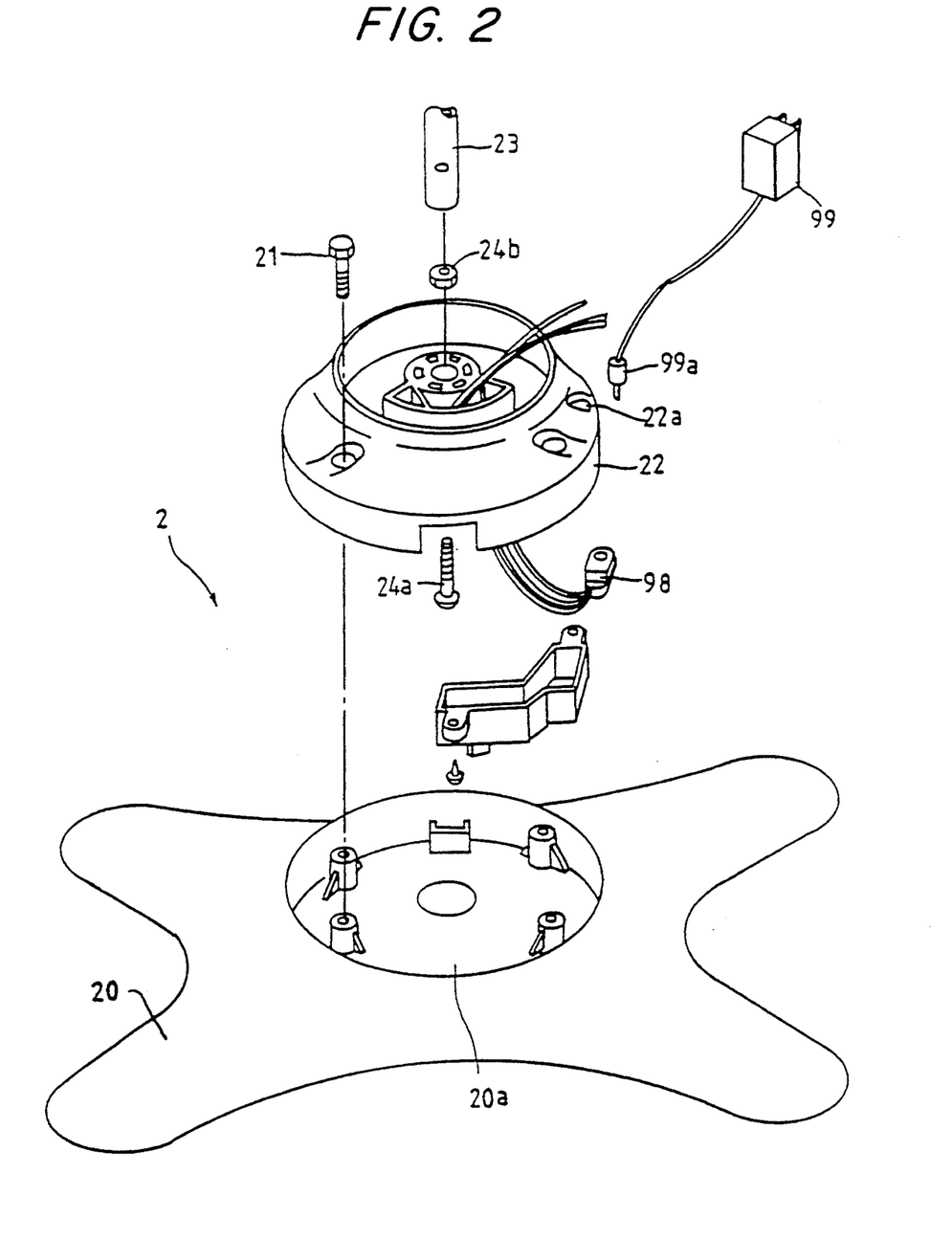
FIG. 2 is an exploded perspective view illustrating a base of the drive simulation apparatus of the embodiment shown in FIG. 1.

As shown in FIG. 2, the base 2 comprises a leg 20 and a column holder 22 fixed in a recess 20a formed in the leg 20. The column holder 22 is fixed to the leg 20 with four bolts 21, only one of which is shown. Reference numeral 98 designates a jack into which fits a plug 99a of an AC adapter 99. The plug 99a is inserted through opening 22a.

Figure 3:
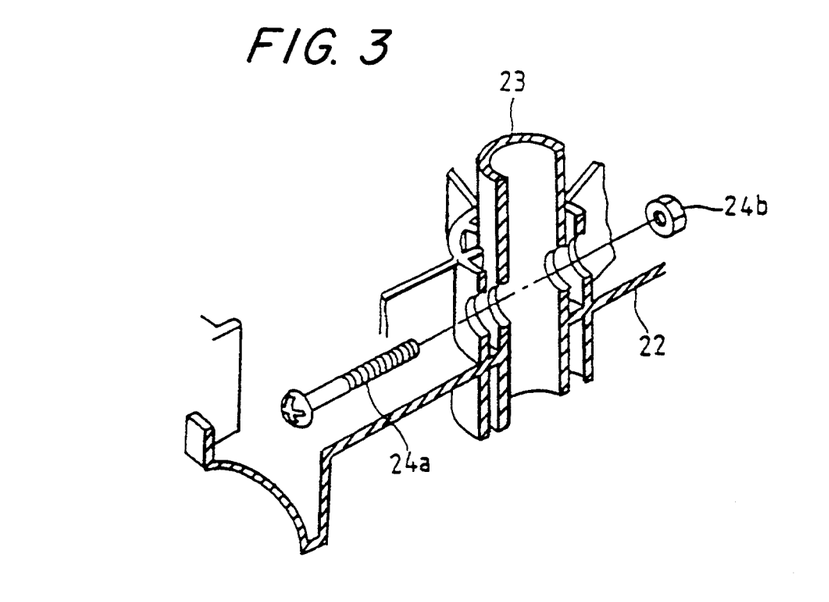
FIG. 3 is a partially cut-away perspective view illustrating part of the base of the drive simulation apparatus in FIG. 1.

As shown in FIG. 3, a lower portion of column 23 is fixed to a column holder 22 with a male volt 24a and a female nut 24b.

Figure 4:
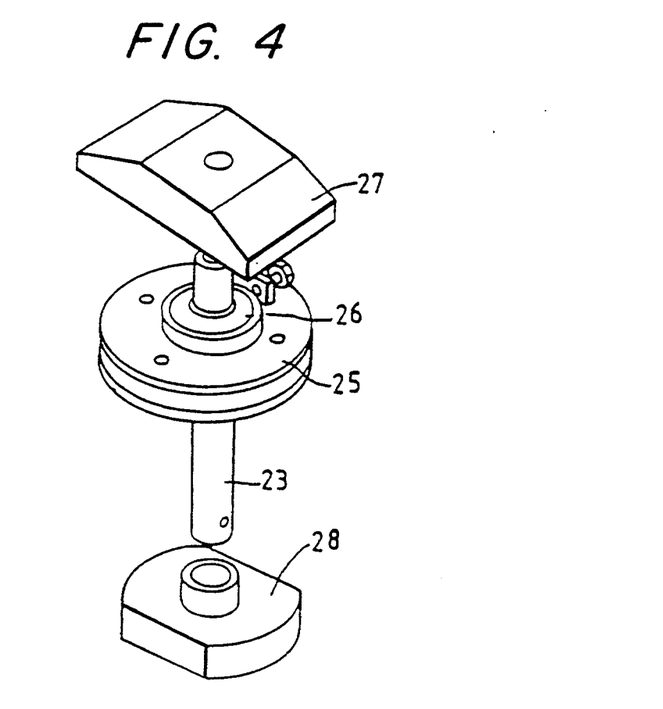
FIG. 4 is a perspective view illustrating column and pulley mechanisms of the drive simulation apparatus of the embodiment in FIG. 1.

As shown in FIG. 4, the top part of the column 23, which is located in the driving compartment body, is fixed to a pulley 25 with screws. A thrust bearing 26 is provided on the pulley 25. On the thrust bearing 26 is seated an intervening part 27 which is secured or abutted to an upper inner surface of the driving compartment body. Reference number 28 designates a further intervening part provided between the pulley 25 and a lower inner surface of the driving compartment body.

Figure 5:
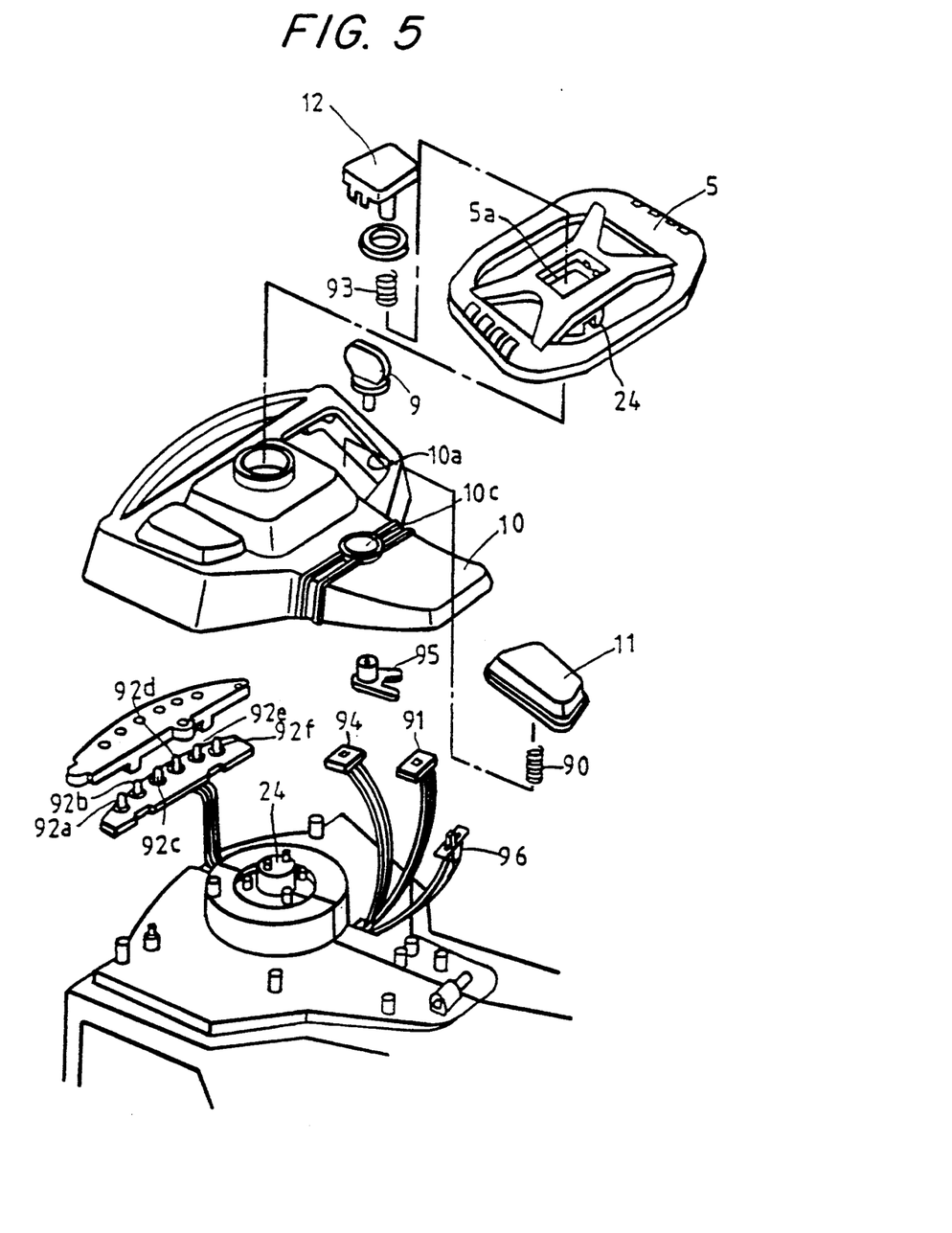
FIG. 5 is an exploded perspective view illustrating the drive simulation apparatus of the embodiment.
Figure 6:
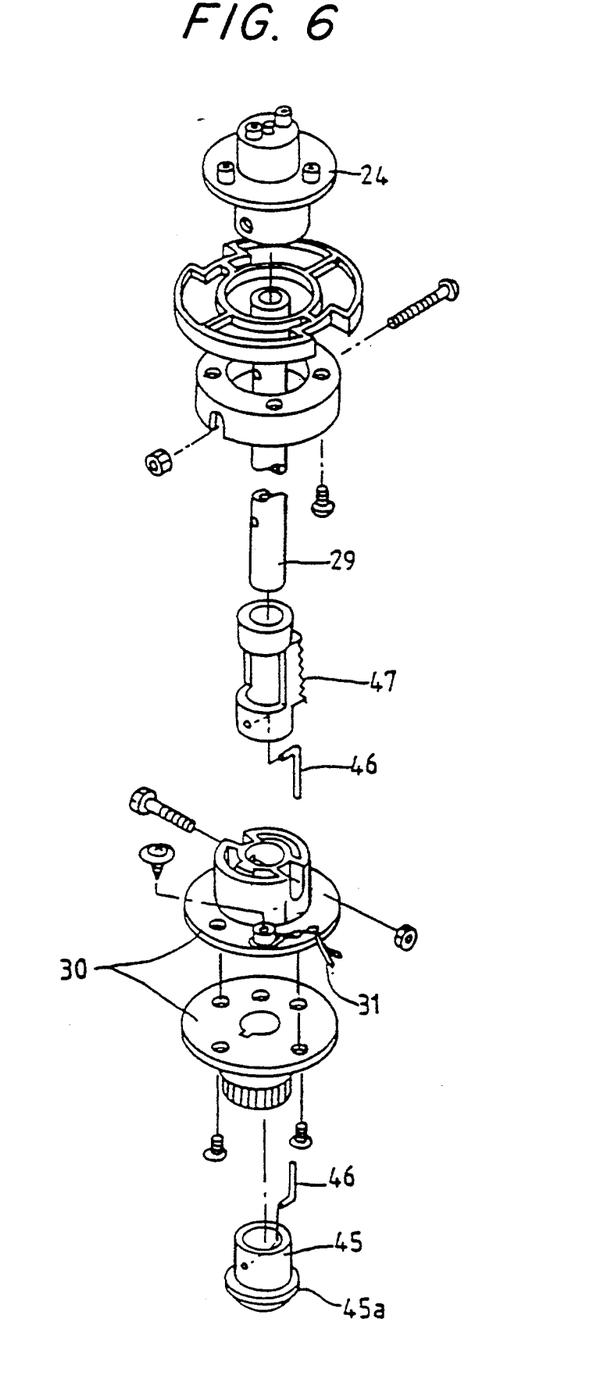
FIG. 6 is an exploded perspective view illustrating a shaft of a steering wheel and its mounting parts of the drive simulation apparatus of the embodiment.
Figure 7:
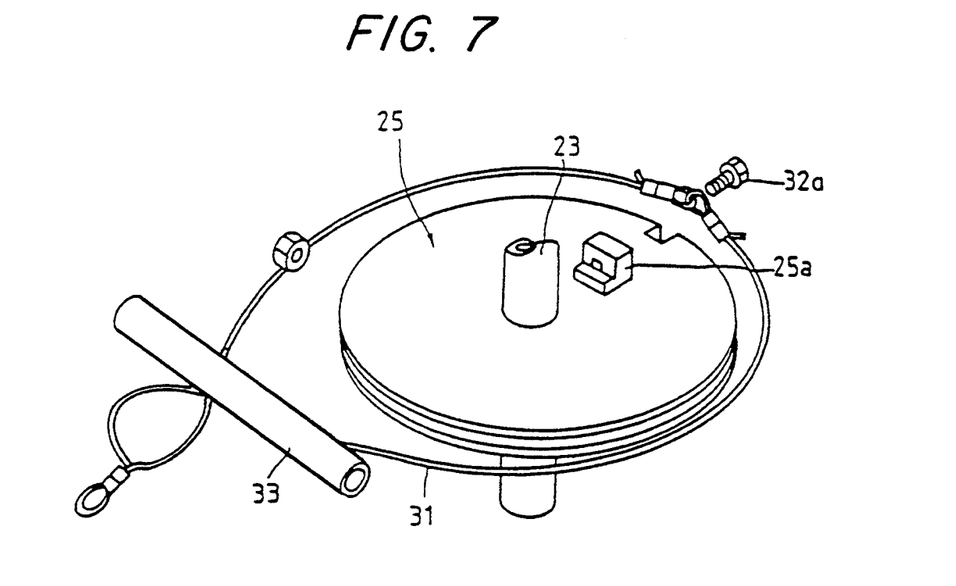
FIG. 7 is a perspective view illustrating a pulley mounted on a column of the drive simulation apparatus of the embodiment.

With reference to FIGS. 5–7, the steering wheel 5 is coupled to the steering shaft 29 through a connector 24. A moveable pulley 30 is fixed on the steering wheel shaft 29 with screws. Between the moveable pulley 30 and the pulley 25, a rope 31 is stretched. The rope 31 has rings for attachment to the pulleys 25 and 31. Rings at the ends of the rope are fixed on fixture 25a of pulley 25 with a bolt 32a. A ring in the middle of the rope 31 is engaged with a boss on the moveable pulley 30. A rod 33 is located between the pulleys 25 and 30 for changing the stretching direction of the rope 31. The rod 33 extends horizontally within the driving compartment body.

Figure 8:
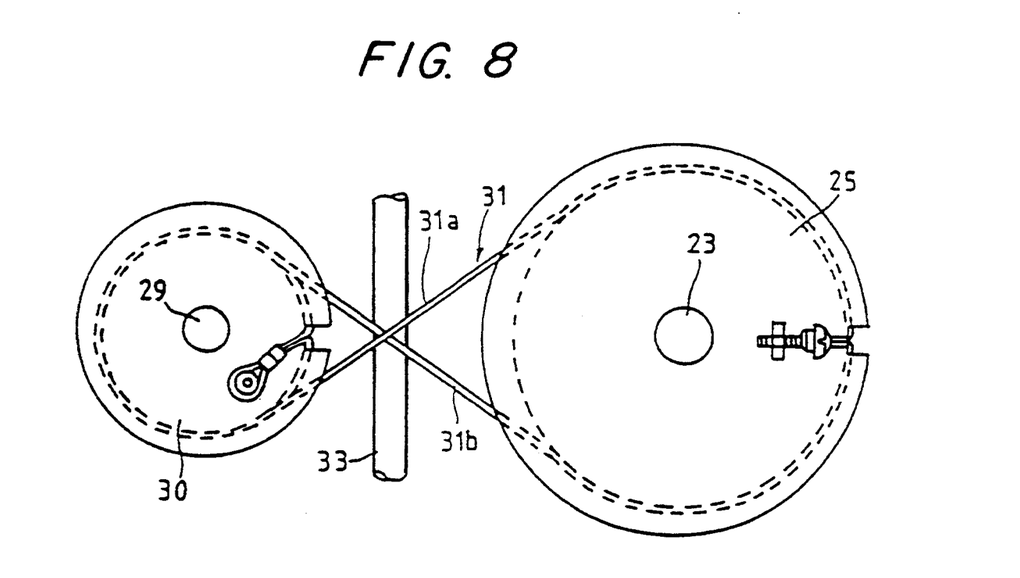
FIG. 8 is a plan view illustrating a rope-wrapped transmission mechanism used in the drive simulation apparatus of the embodiment.

FIG. 8 illustrates that the rope 31 is wrapped around the pulleys 25 and 30 and extends therebetween. The rope has two portions 31a and 31b which cross between the pulleys 25 and 30. If the steering wheel is rotated, for example to the right, the moving pulley 30 rotates with the steering wheel. Since the pulley 25 is fixed, the rope portion 31a on the right side with respect to the advancing direction is tightened while the rope portion 31b is loosened. If the steering wheel is further rotated to the right, the moveable pulley 30 is moved in an arc to the right in an arc by the tension in the rope portion 31a to thereby move the driving compartment body with respect to the base. If the steering wheel is rotated to the left, the moveable pulley 30 is moved to the left by the tension in the rope portion 31b resulting in the driving compartment body moving to the left with respect to the base.

B. Vibrating Mechanism of the Driving Compartment Body

Figure 9:
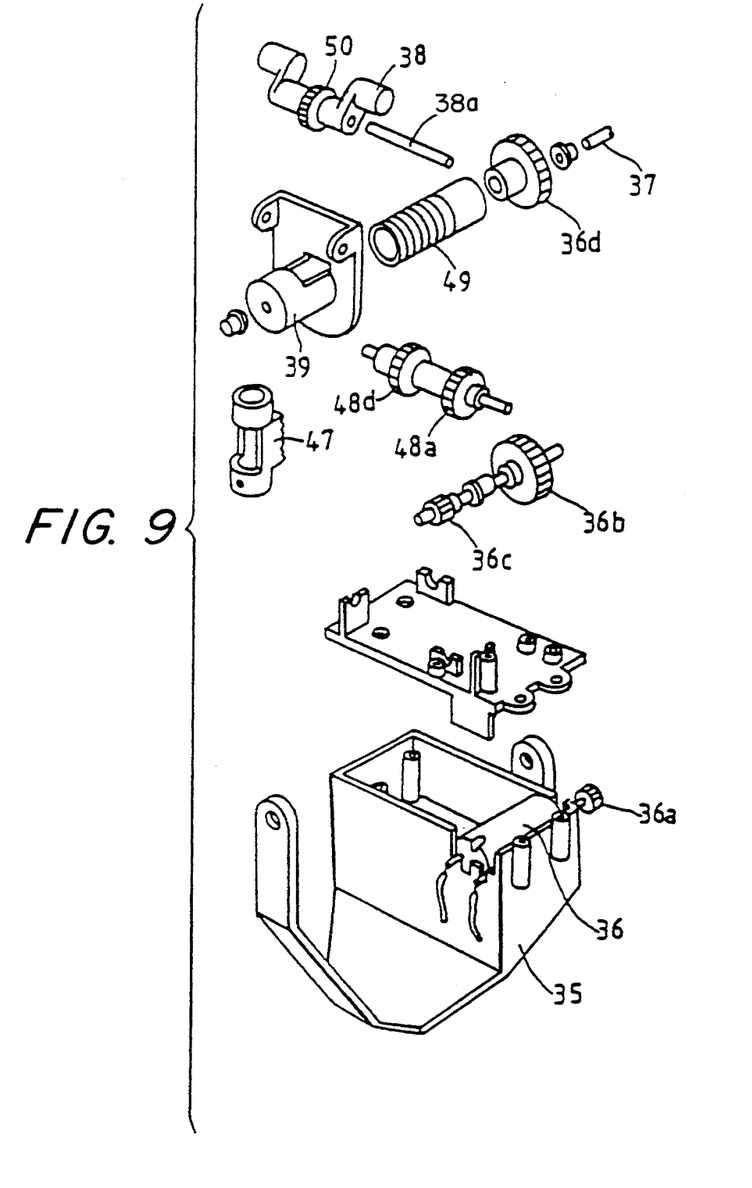
FIG. 9 is an exploded perspective view illustrating part of a body vibrating mechanism used in the drive simulation apparatus of the embodiment.

As stated above, the driving compartment body is vibrated by moving a weight located in the driving compartment body in an eccentric rotation. As shown in FIG. 9, a motor 36 is provided in a motor box 35 which is in the driving compartment body. The driving force of the motor 36 is transmitted to a shaft 37 through gears 36a, 36b, 36c and 36d. A weight holder 39 is fixed on the shaft 37 such that the weight holder 39 and hence the weight 38 are eccentrically rotated by the driving force of the motor 36 to thereby vibrate the driving compartment body. The weight 38 is rotatably mounted on the weight holder 39 through a shaft 38a.

Figure 10:
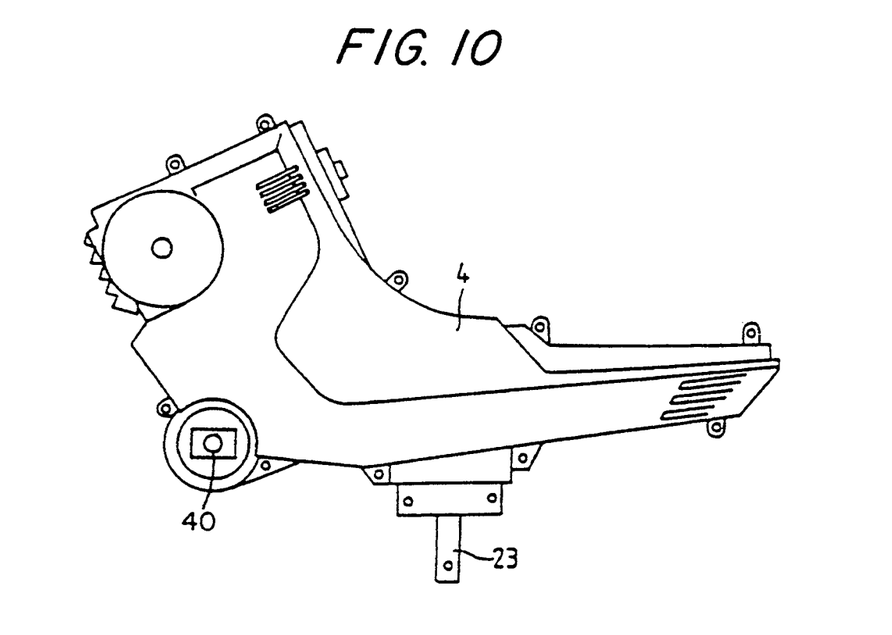
FIG. 10 is a side view of the driving compartment body of the drive simulation apparatus of the embodiment.
Figure 11:
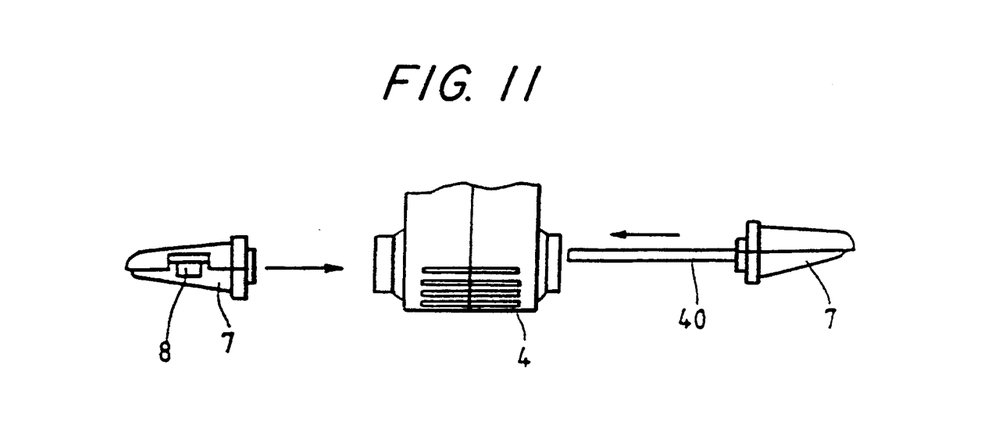
FIG. 11 is a front view of a lower part of the car body showing a mounting state of footrests used in the drive simulation apparatus of the embodiment.
Figure 12:
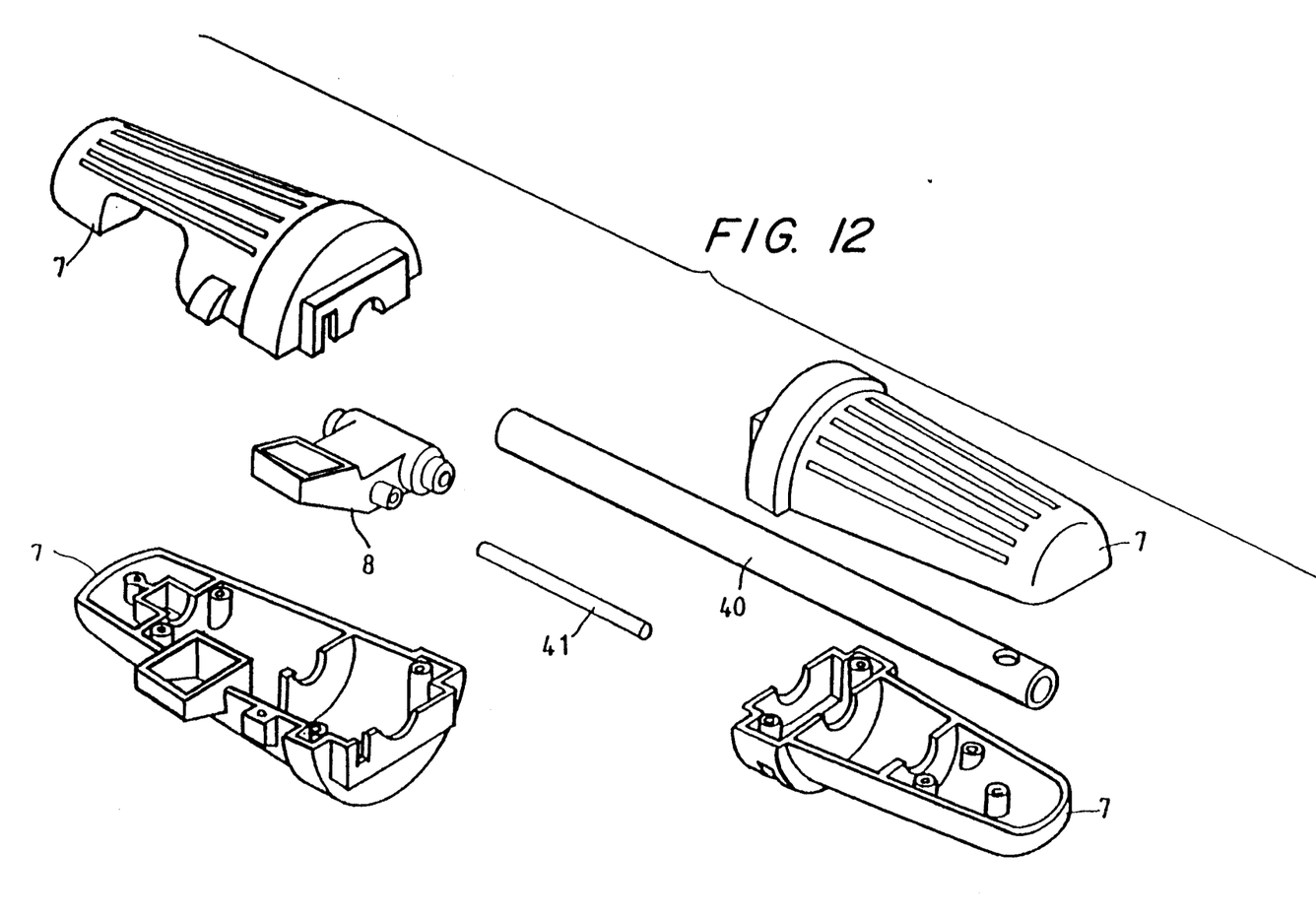
FIG. 12 is an exploded perspective view showing the footrests used in the drive simulation apparatus of the embodiment.

The drive simulation apparatus is adapted to change the magnitude of vibration in accordance with the degree of pressure applied to the accelerator pedal. As shown in FIG. 10, a shaft 40 is inserted through a hole formed in a lower curved portion of the body 4 and extends through the body 4 as shown in FIG. 11. Footrests 7 are at either end of the shaft 40 with the right footrest 7 being provided with an accelerator pedal 8. As can be seen from FIG. 12, the footrests 7 are provided in two vertically divided pieces. A rod 41 is attached to the accelerator pedal 8 for transmitting the motion of the accelerator pedal 8.

Figure 13:
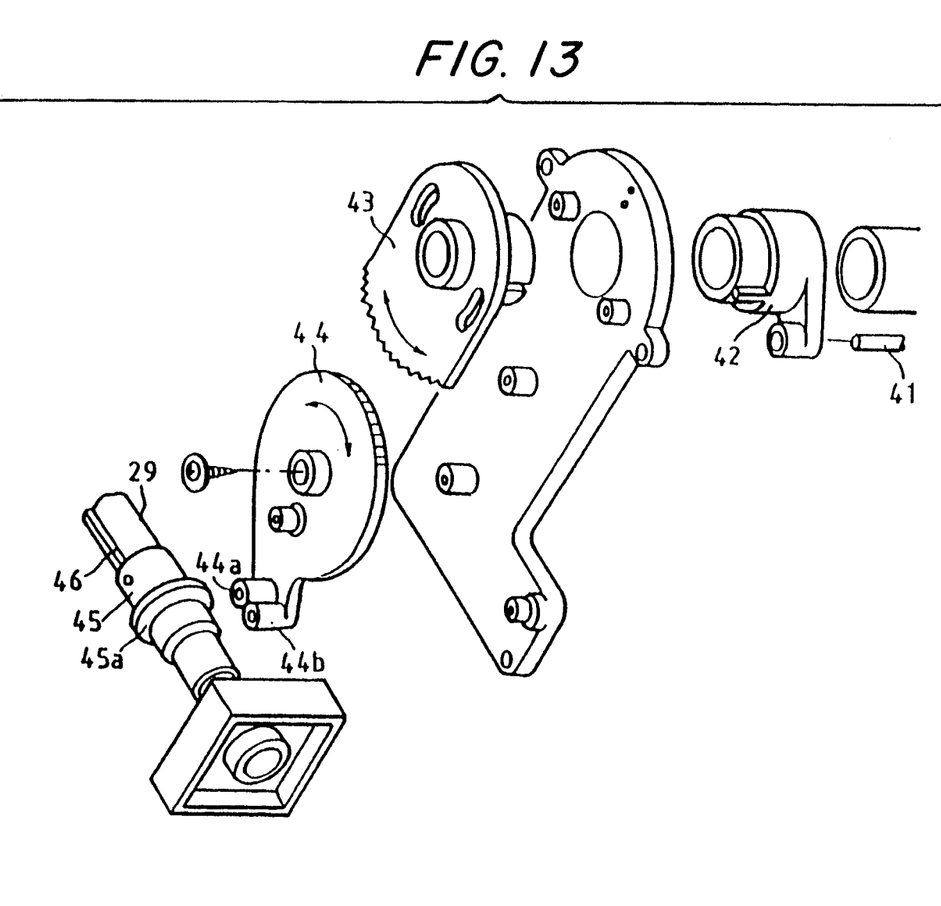
FIG. 13 is an exploded perspective view illustrating part of a body vibrating mechanism of the embodiment.

As shown in FIG. 13, the accelerator pedal is coupled to a connector 42 via rod 41. The connector 42 rotates about a shaft integrally with the accelerator pedal. The connector 42 is also coupled to a first partially toothless gear 43 within the driving compartment body. The partially toothless gear 43 meshes with a second partially toothless gear 44. A pair of protrusions 44a and 44b are formed at an eccentric position on the second partially toothless gear 44 so that they sandwich a bow 45a of a sliding member 45 which slides on the steering wheel shaft 29.

As shown in FIG. 6, the sliding member 45 is coupled to a moveable rack 47 through an intermediate rod 46. The movable rack 47 is loosely fitted on the steering wheel shaft 29 so that it can move in the axial direction of the steering wheel shaft 29. As shown in FIG. 9, the moveable rack 47 is coupled to a moveable cylindrical rack 49 through gears 48a and 48d. The cylindrical rack is threaded with threads being closer together at one end of the rack. The cylindrical moveable rack 49 is provided on the shaft 37 and meshes with a gear 50 formed on the weight 38.

Before the accelerator pedal is depressed, the weight 38 is positioned away from the shaft 37. When the accelerator pedal is depressed, the weight 38 moves towards the shaft 37. As a result, the weight 38 rotates faster, increasing the magnitude of vibrations. In other words, the vibrations are small in an idling state but larger when the accelerator pedal is depressed to simulate real life driving vibrations.

C. Road Terrain Display Mechanism

Figure 14:
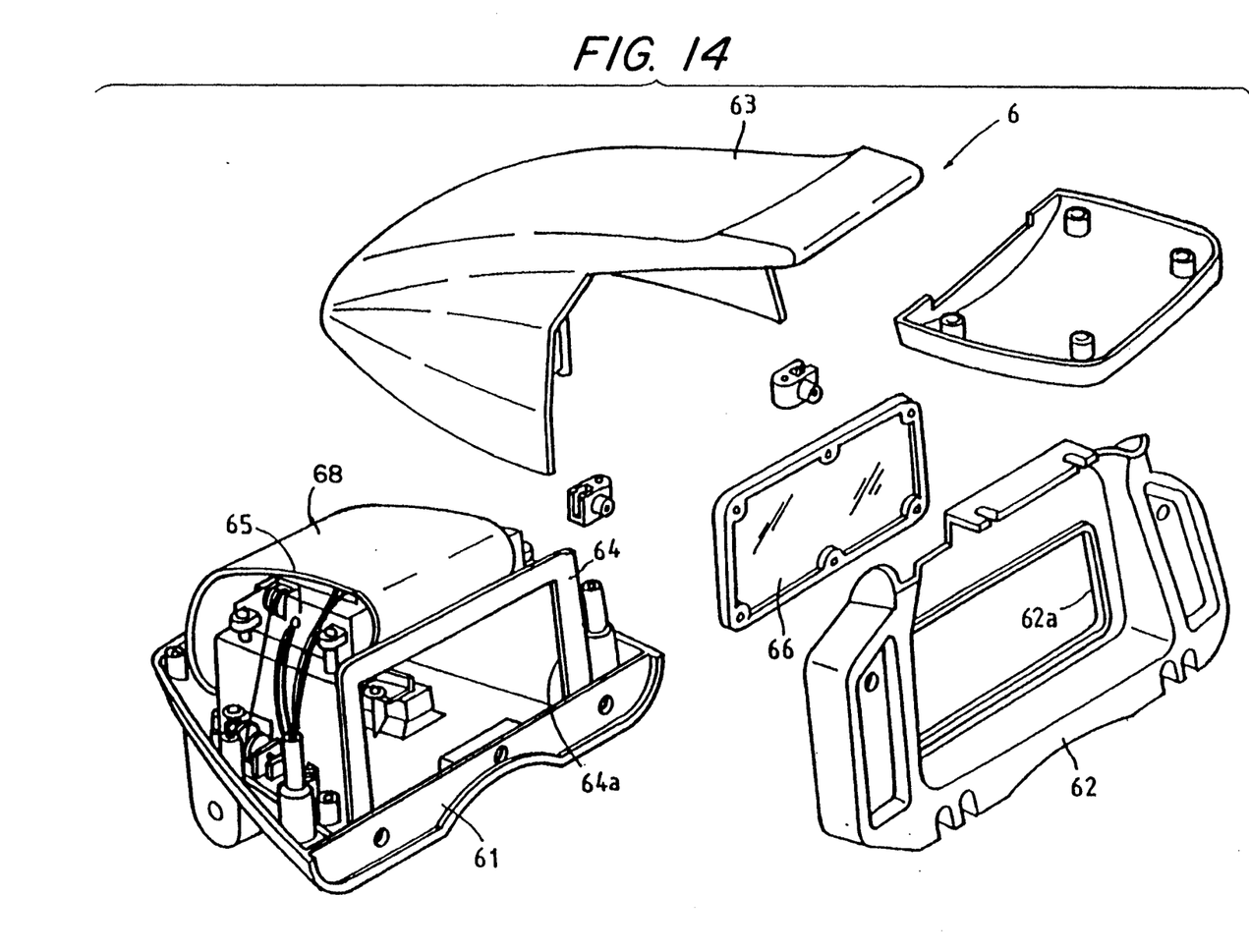
FIGS. 14 and 15 are exploded perspective views illustrating a road terrain display mechanism used in the drive simulation apparatus of the embodiment.

The outer appearance of the road terrain display mechanism 6 is shown in FIG. 14. The display of road terrain by the road terrain display mechanism 6 is achieved by a lamp illuminating an endless film 68 on which the road terrain is painted. The mechanism 6 has a lower frame 61, a front frame 62 and an upper frame 63. It also has a pedestal 64 which carries a film holder 65.

Figure 15:
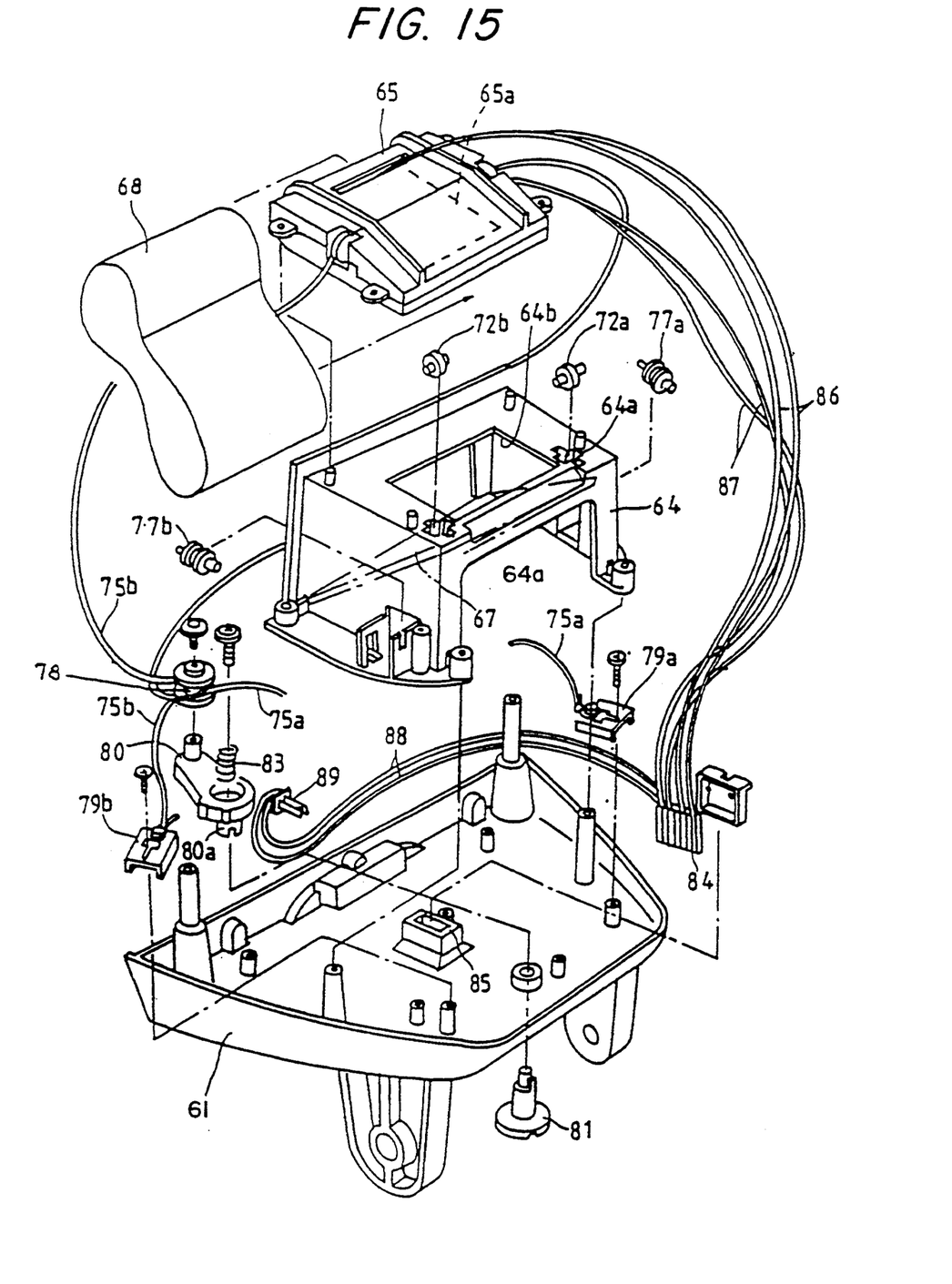

A rectangular window 62a is formed in the front frame 62 and a transparent plate 66 is fitted in the rectangular window 62a. The pedestal 64 has an opening 64b formed on the front side thereof. As shown in FIG. 15, inside the pedestal is an opaque screen 67 which is downwardly inclined towards the far side of the pedestal 64.

Figure 16:
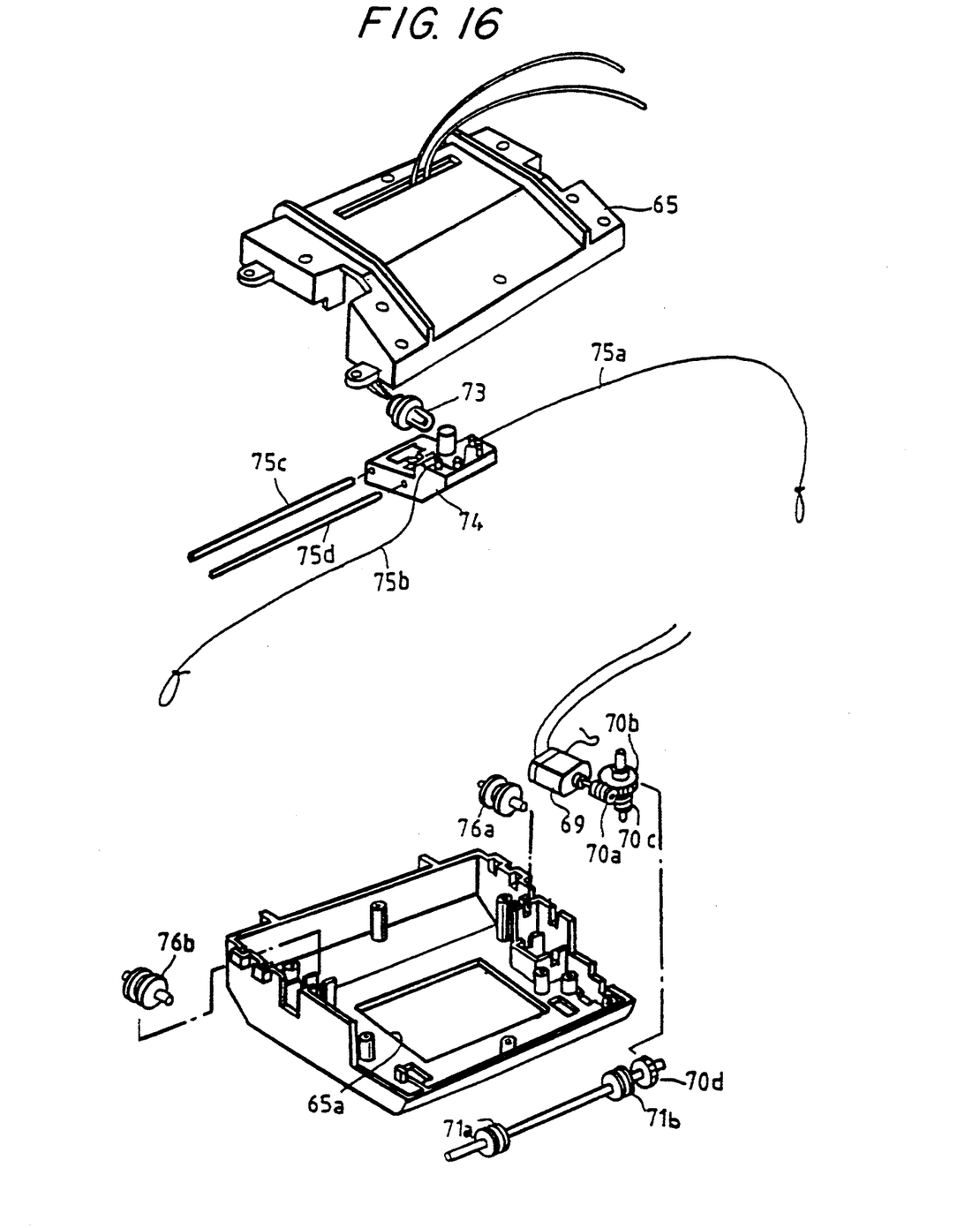
FIG. 16 is an exploded perspective view illustrating a film holder used in the drive simulation apparatus of the embodiment.

The endless film 68 is wound around the film holder 65 so that a portion of the endless film 68 is between the lamp and the screen 67. As shown in FIG. 16, the endless film is transported by a motor 69 provided in the film holder 65. The force from the motor 69 is transported to the endless film through gears 70a, 70b, 70c and 70d and rubber rollers 71a and 71b. The lamp 73 is also shown in FIG. 16. For smoothing the movement of the endless film, idle rollers 72a and 72b (see FIG. 15) are provided in recesses 64a respectively. The recesses are formed in the pedestal 64.

In the lower frame of the film holder 65 is rectangular opening 65a which corresponds to the rectangular opening 64b of the pedestal 64. The lamp 73 (see FIG. 16) is also provided in the film holder 65 so that the lamp 73 partially illuminates the endless film 68 through the rectangular opening 65a. This projects road terrain images onto the screen 67 through the rectangular opening 64b, the road terrain images being on the endless film.

A lamp holder 74 for carrying the lamp 73 is moveable in the left and right directions along guide bars 75c and 75d which extend transversely over the film holder 65. Two ropes 75a and 75b are wrapped around the lamp holder 74 and are extracted from the film holder 65 through guide pulleys 76a and 76b provided on the left and right sides of the film holder 65. The extracted ropes 75a and 75b are wrapped around the moveable pulley 78 (see FIG. 15). The extracted ropes 75a and 75b are wrapped around a moveable pulley 78 (see FIG. 15) transversing guide pulleys 77a and 77b provided outside the pedestal 64. The ropes are fixed to the lower frame 61 via fixtures 79a and 79b. In this manner when moveable pulley 78 is moved to the left or to the right, the lamp is moved to the left or right, respectively. The lamp is moved a distance about twice the distance moved by the moveable pulley 78.

According to the present embodiment, a mechanism is provided to move the lamp to the left or right when the steering wheel is rotated. More specifically, the moveable pulley 78 is mounted on the free end of a swinging member 80. Swinging member 80 is coupled to a gear on the lower side of the moveable pulley 30 (see FIG. 8) via the connector 81. Moveable pulley 78 is attached to the steering wheel shaft. As a result, rotation of the steering wheel causes the free end of the swinging member 80 to swing which pulls the ropes 75a and 75b to thereby laterally move the lamp. By doing this, the illuminated portion of the endless film 68 is laterally shifted.

After the lamp has reached an extreme lateral end and the steering wheel is further rotated, the rope 75a and 75b maybe cut or other parts may be damaged. To avoid such a problem, the shaft 80a of the swinging member 80 is releasably secured to the connector 81. A spring 83 biases the swinging member 80 towards the connector 81. A projection on connector 81 engages with an indentation on swinging member 80. Thus, when excessive force is applied to the steering wheel, the projection is released from the indentation.

D. Power Supply of Drive Simulation Apparatus

As shown in FIG. 15, a plug 84 is inserted into a jack 85 which is in the lower frame 61. The road terrain display mechanism is supplied with electric power through the jack 85 and plug 84. Specifically, the plug 84 is connected to a cable 86 to supply power for the lamp. The plug 84 is also connected to cable 87 to supply power for a motor and a cable 88 to supply power for a squeak sound switch 89 to be described later.

E. Other Functions of the Drive Simulation Apparatus

The drive simulation apparatus is further provided with a turbo sound generator, a turbo indication display mechanism, a horn sound generator and a squeak sound generator. Also, a control IC and sound synthesizing LSI are provided for controlling the sound generated and the speed at which the endless film travels. Further, a switch mechanism is provided for starting the drive simulation apparatus.

As shown in FIG. 5, the turbo sound generator comprises a turbo button 11 fitted in an opening 10a in a dash board 10. The button 11 is inserted through the bottom of the opening and urged upwardly by a spring 90. When the turbo button 11 is depressed, it depresses a switch 91 provided below the turbo button 11. The switch 91 provides an output signal to the control IC and the sound synthesizing LSI which generate a turbo sound from a speaker.

The turbo indication display mechanism includes a plurality of lamps 92a, 92b, 92c, 92d, 92e and 92f which are linked by the control IC when the turbo button 11 is depressed. The horn sound generator comprises a horn button 12 fixed in an opening 5a in the steering wheel 5. The horn button 12 is inserted from the bottom side of the opening 5a and urged upwardly by a spring 93. To operate the horn sound generator, the horn button 12 is depressed to contact switch 94 which sends an output signal to the control IC and the sound synthesizing IC which, in turn, generates a horn sound from the speaker.

It should be noted that although an alternating current power supply and an adapter are shown as the power supply for this embodiment, a rechargeable battery or other power source may also be used.

The switch mechanism comprises the key switch 9 which is inserted in a hole 10c in the dashboard 10, a two way member 95 engaged with a lower portion of the key switch 9 and a slide switch 96 which is turned on and off by the two way member 95.

The squeak sound generator is provided for generating a squeak sound when the steering wheel 5 is excessively rotated. As shown in FIG. 15, the squeak sound generator is activated by a switch 89. When the steering wheel is excessively rotated, the squeak sound switch 89 is activated by a protrusion formed on the periphery of this swinging member 80. The squeak sound switch 89 provides an output signal to the control IC and the sound synthesizing LSI which thereby produce a squeak sound from the speaker. The operation of the drive simulation apparatus will now be explained. When the steering wheel is turned, it causes the driving compartment body to turn with respect to the base. The turning of the steering wheel also moves a lamp to change the illuminated portion of the endless film so that the player can feel as if he or she were actually driving along a curved road which is displayed by the road terrain display mechanism.

Because the rotation of the driving compartment body and the change of the illuminated portion of the endless film are both accomplished by mechanical means, the capacity of the motor can be reduced by a corresponding amount. This decreases the weight of the drive simulation apparatus. Also, the size of the drive simulation apparatus is reduced, allowing it to be used anywhere, even outside the amusement park or game center.

Additionally, rope, which is relatively light weight, is used as the transmission mechanism to transmit the driving compartment body rotation power and the lamp moving power. This allows the weight of the drive simulation apparatus to be even further reduced.

While the drive simulation apparatus according to the present invention has been described in connection with an embodiment thereof, the present invention is not limited to this particular embodiment. A variety of modifications are possible without departing from the scope thereof.

For example, although a rope wrap transmission mechanism is used for both turning the driving compartment body and changing the illuminated portion of the film, rope may be used in only one of the two mechanisms. Alternatively, a link mechanism or gear mechanism, or a combination of the two, may be used in place of the rope wrap transmission mechanisms for either or both of the functions. It should be noted, however, that the use of the rope wrap transmission mechanism provides the simplest structure.

Furthermore, although the endless film was described as being transported by a motor, a spring mechanism maybe used for this purpose. Still further, the weight which vibrates the body has been described as being eccentrically rotated. Alternatively, the weight could be reciprocally moved. According to the drive simulation apparatus of the present invention, the driving compartment body turns with respect to the base giving the player a physical feeling as if he or she were actually driving along a curved road while visually enjoying the drive. Also, if the road terrain display mechanism and illuminated portion changing means are provided, the display road terrain further appears realistic. Since the rotation of the driving compartment bodies is achieved by mechanical means, the capacity of the motor can be reduced by a corresponding amount thereby decreasing the weight of the drive simulation apparatus and facilitating transportation of same. Also, because the size of the drive simulation apparatus is reduced, it can be used anywhere even outside amusement parks or game centers.

Further, a rope wrap transmission mechanism used to turn the driving compartment body even further reduces the weight of the drive simulation apparatus.

I claim:

1. A drive simulation apparatus comprising:
   a base;
   a driving compartment body rotatably mounted on the base;
   a seat on which a driver can sit, the seat being attached to and rotatable with the body;
   a steering wheel rotatably mounted to the body;
   non-motorized turning means for turning the body with respect to the base when the steering wheel is turned with respect to the base;
   road terrain display means for displaying moving road terrain, the road terrain display means comprising:
   a screen;
   a film holder;
   a light source;
   an endless film with road terrain images thereon, the endless film being wrapped around the film holder with a portion of the film being between the screen and the light source so that the road terrain images on the film can be projected onto the screen;
   rotation power supply means for rotating the endless film;
   a swinging member coupled to the steering wheel to be rotatable with the steering wheel and having a free end offset from an axis of rotation of the swinging member;
   a light holder in which the light source is mounted, the light holder being movable in a direction parallel to a surface of the screen; and
   force transmission ropes coupled to the light holder and the free end of the swinging member to transmit motion from the swinging member to the light holder; and
   a body vibrating means for vibrating the body.

2. The drive simulation apparatus as claimed in claim 1, wherein the turning means comprises:
   a first pulley attached to the base;
   a second movable pulley rotatable with the steering wheel about a central axis and movable in an arc to be rotatable with respect to the base; and
   rope transmission means having a first rope portion and a second rope portion, the rope transmission means attaching the first pulley and the second movable pulley so that when the second movable pulley is rotated in a first direction, tension is applied to the first rope portion to move the second movable pulley and the body in the first direction with respect to the base and so that when the second movable pulley is rotated in a second direction, tension is applied to the second rope portion to move the second movable pulley and the body in the second direction with respect to the base.

3. The drive simulation apparatus as claimed in claim 1, further comprising:
   a turbo button;
   lighted turbo indication means for lighting at least one light source when the turbo button is depressed; and
   turbo sound producing means for producing a turbo sound when the turbo button is depressed.

4. The drive simulation apparatus as claimed in claim 1, further comprising:
   an accelerator pedal; and
   switch means operatively connected to the accelerator pedal for supplying a signal to the rotation power supply means to start and stop the rotation of the endless film when pressure is applied to and released from the accelerator pedal, respectively.

5. The drive simulation apparatus as claimed in claim 1, further comprising:
   a turbo button;
   lighted turbo indication means for lighting at least one light source when the turbo button is depressed;
   turbo sound producing means for producing a turbo sound when the turbo button is depressed; and
   film speed adjustment means for increasing the speed at which the endless film is rotated when the turbo button is depressed.

6. The drive simulation apparatus as claimed in claim 1, wherein the swinging member has an indentation which is biased towards a connector having a projection, the connector being rotatable with the steering wheel, the swinging member being coupled to the steering wheel by the projection fitting into the indentation so that when the steering wheel is excessively rotated, the projection escapes from the indentation allowing the connector to turn independently of the swinging member.

7. The drive simulation apparatus as claimed in claim 1, further comprising:

a squeak sound switch positioned in the vicinity of the free end of the swinging member so that the free end of the swinging member can contact the squeak sound switch to thereby turn on the squeak sound switch; and squeak sound producing means for producing a squeak sound when the squeak sound switch is turned on.

8. The drive simulation apparatus as claimed in claim 1, wherein the rotation power supply means is an electric motor.

9. The drive simulation apparatus as claimed in claim 1, further comprising:

a horn button; and a horn sound producing means for producing a horn sound when the horn button is depressed.

10. A drive simulation apparatus comprising:

a base;

a driving compartment body rotatably mounted on the base;

a seat on which a driver can sit, the seat being attached to and rotatable with the body;

a steering wheel rotatably mounted to the body;

non-motorized turning means for turning the body with respect to the base when the steering wheel is turned with respect to the body;

road terrain display means for displaying moving road terrain; and a body vibrating means for vibrating the body, the body vibrating means comprising:

a movable rack which is tubular in shape, threaded and turnable about a central axis;

vibration power supply means for rotating the movable rack;

a gear rotatably on an axis perpendicular to the axis of the movable rack, the gear being engaged with threads of the movable rack to be rotated thereby; and a weight located within the driving compartment body and operatively connected to the gear to be movable by the gear.

11. The drive simulation apparatus as claimed in claim 10, wherein the threads of the movable rack are closer together at one end of the rack, the body vibrating means being linked to an accelerator pedal to engage the gear with end of the rack having more closely spaced threads when the accelerator pedal is depressed to thereby increase the speed at which the gear rotates and the weight moves.

12. The drive simulation apparatus as claimed in claim 10, wherein the weight rotates about the same axis about which the gear rotates and the weight is offset from the axis to rotate eccentrically.

13. A drive simulation apparatus comprising:

a base;

a driving compartment body rotatably mounted on the base;

a steering wheel rotatably mounted to the body;

non-motorized turning means for turning the body with respect to the base when the steering wheel is turned with respect to the body, the turning means comprising:

a first pulley attached to the base;

a second movable pulley rotatable with the steering wheel about a central axis and movable in an arc to be rotatable with respect to the base; and rope transmission means having a first rope portion and a second rope portion, the rope transmission means attaching the first pulley and the second movable pulley so that, when the second movable pulley is rotated in a first direction, tension is applied to the first rope portion to move second movable pulley and the body in the first direction with respect to the base and so that, when the second movable pulley is rotated in a second direction, tension is applied to the second rope portion to move the second movable pulley and the body in the second direction with respect to the base; and road terrain display means for displaying moving road terrain, the road terrain display means comprising:

a swinging member coupled to the steering wheel to be rotatable with the steering wheel and having a free end offset from an axis of rotation of the swinging member;

a light holder in which the light source is mounted, the light holder being movable in a direction parallel to a surface of a screen; and force transmission ropes coupled to the light holder and the free end of the swinging member to transmit motion from the swinging member to the light holder.

* * * * *